(No Model.)

C. L. FERRIOTT.
COTTON CHOPPER.

No. 339,753. Patented Apr. 13, 1886.

WITNESSES
S. E. E. Stevens.
P. E. Stevens.

INVENTOR
Charlie L. Ferriott.
Per W. X. Stevens.
Attorney

N. PETERS, Photo-Lithographer, Washington, D. C.

UNITED STATES PATENT OFFICE.

CHARLIE L. FERRIOTT, OF TEHUACANA, TEXAS, ASSIGNOR TO JOHN T. ERWIN, OF SAME PLACE.

COTTON-CHOPPER.

SPECIFICATION forming part of Letters Patent No. 339,753, dated April 13, 1886.

Application filed January 2, 1886. Serial No. 187,384. (No model.)

*To all whom it may concern:*

Be it known that I, CHARLIE L. FERRIOTT, a citizen of the United States, residing at Tehuacana, in the county of Limestone and State of Texas, have invented certain new and useful Improvements in Cotton-Choppers; and I do hereby declare the following to be a full, clear, and exact description of the invention, such as will enable others skilled in the art to which it appertains to make and use the same.

This invention relates to that class of farming machines which are used to assist in planting and cultivating cotton and corn, and more particularly to those parts of the machine which serve to chop out superfluous plants of cotton from rows of young plants. In this method of cultivation the cotton-seed is planted in rows, and the young plants, coming up very much closer together than it is profitable to allow them to grow, have to be so thinned out as to leave plants called "stands" about two feet apart along the row, so that about twenty inches in every twenty-four inches along the row have to be chopped clean of plants.

To this end my invention consists in the construction and combination of parts forming a cotton-chopper, hereinafter described and claimed, reference being had to the accompanying drawings, in which—

Figure 1:
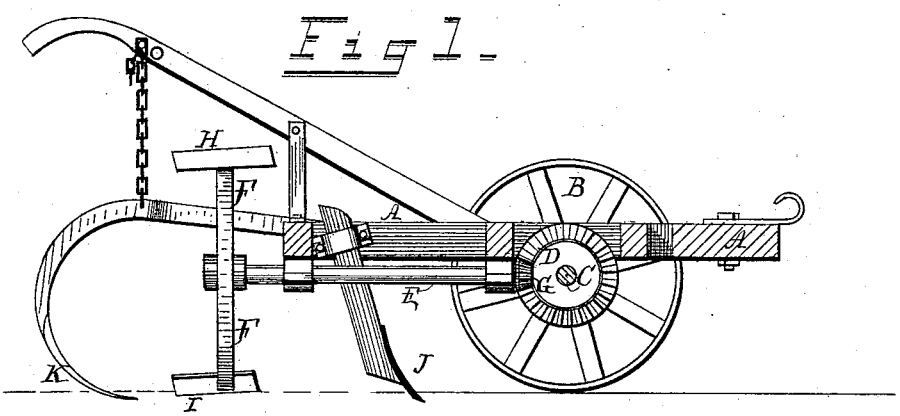
Figure 2:
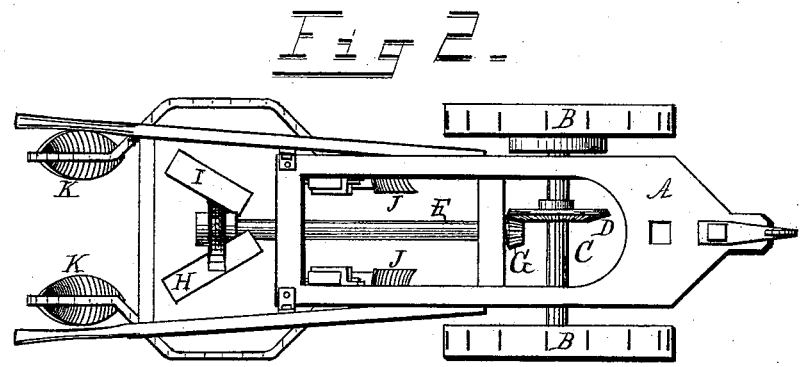
Figure 3:
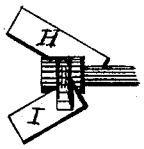
Figure 4:
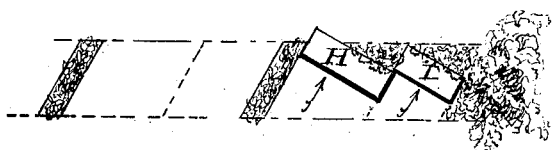

Figure 1 is a side elevation of my cotton-chopper, part in section. Fig. 2 is a sectional plan view of the same. Fig. 3 is a plan view of the hoes or choppers, and Fig. 4 is a diagram showing the action of the machine on the ground.

A represents the frame of the machine, mounted on a pair of wheels, B, by means of an axle, C, which is rigidly fixed in the wheels and journaled in boxes secured to the said frame.

D is a beveled gear-wheel, fixed upon the axle to revolve therewith.

E is a shaft journaled in boxes on the frame A, longitudinally therewith, provided at one end with two or more arms, F, and at the other end with a beveled gear-wheel, G, which engages the gear-wheel D, to be revolved thereby.

H and I represent hoes or choppers fixed upon the arms F nearly tangent to radii passing through their points of attachment from the axis of the shaft E. These choppers constitute the main characteristic of my invention.

Let us suppose that it is desired to leave stands of plants every two feet along the row, this distance being termed a "unit of space;" then the two beveled gear-wheels should be so proportioned that the shaft E will be actuated to make one complete revolution at every advance of a unit of space by the main wheels B. For instance, if the main wheels were each eight feet in circumference, the shaft E should make four revolutions to one revolution of the axle C, requiring the beveled wheel D to be four times as large as the beveled wheel G. Now, if there are two hoes, H and I, each one foot wide, striking across the row, they will chop up all the cotton-plants as the machine advances; but if each hoe were only eight inches wide there would remain four inches in every foot along the row uncut. This would require the trimmers who follow after the machine with hand-hoes to cut out every other stand, to avoid which I make one hoe, H, twelve inches wide, and the other hoe, I, only eight inches wide. By this means every revolution of the hoe-shaft will chop out twenty inches while the machine is advancing twenty-four inches, thus leaving four inches for the stand in each unit of space. This four inches is all that requires to be trimmed up by the hand-hoers, thus accomplishing a great saving of time and labor in trimming.

The stroke of the hoe being across the row, while the machine advances along the row, it is evident that the mark or track made by each hoe is diagonal to the line of travel, the hoes moving in a spiral path like a coarse screw-thread, as shown in Fig. 4.

In order that each hoe may chop only its own width from the row of plants, I secure each hoe-blade H I upon its arm F diagonal to the shaft E and parallel with the spiral line of motion of the hoes.

There might be three or more hoes mounted as described; but in every case one hoe should be materially narrower than the others, to leave a standing plant, and the sum of the widths of all the hoes should be less than the distance advanced by the machine at each revolution of the hoe-shaft by the amount required for the said stand, as described.

By setting the hoes diagonally, I prevent the advance corner of each hoe from cutting ahead of its intended path, as it would do if the hoes were set, as usual, at right angles to the line of travel of the machine, as shown in dotted lines, Fig. 4.

The two plows J are set to cut away weeds and such plants as scatter along the sides of the row and to cultivate the soil. The two plows K are set to the rear of the chopper, to hill up the soil against the standing plants.

I have designed this machine to be used as a seed-planter in the season therefor, to which end I remove the chopper-shaft and place a seed-box on the frame having in it a seed-dropping cylinder, to be operated by a belt from a pulley on the main wheel-shaft, and I place a removable plow or furrow-opener in the forward part of the frame A, to mark for the seed, while the plows J may be reversed to turn the soil upon the seed-row.

Having thus fully described my invention, what I claim, and desire to secure by Letters Patent, is—

In a cotton-chopper, the combination of an axle, a frame, a shaft journaled longitudinally in the frame, radial arms mounted on the said shaft, gearing connecting the said shaft with the axle, rectangular blades secured upon the ends of the said arms, the said blades being set diagonally, making their side edges parallel with the spiral path of the arms, as shown, and one blade being narrower than the others, substantially as shown and described, whereby each blade will exactly coincide with the spiral path of its motion and stands will be left uncut at equal intervals, as set forth.

In testimony whereof I affix my signature in presence of two witnesses.

CHARLIE L. FERRIOTT.

Witnesses:
JAMES P. ERWIN,
RUSSELL ANTHONY.